United States Patent
Golestani

(10) Patent No.: US 7,102,998 B1
(45) Date of Patent: Sep. 5, 2006

(54) SCALEABLE CONGESTION CONTROL METHOD FOR MULTICAST COMMUNICATIONS OVER A DATA NETWORK

(75) Inventor: S. Jamaloddin Golestani, Union, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/273,948

(22) Filed: Mar. 22, 1999

(51) Int. Cl.
*H04L 12/26* (2006.01)

(52) U.S. Cl. .................................................. 370/235
(58) Field of Classification Search ................ 370/230, 370/232, 231, 235, 254, 256, 270, 295.4, 370/295.52, 400, 432
See application file for complete search history.

(56) References Cited

U.S. PATENT DOCUMENTS

| | | | | |
|---|---|---|---|---|
| 5,313,454 A | * | 5/1994 | Bustini et al. ................. 370/13 |
| 5,633,859 A | * | 5/1997 | Jain et al. ..................... 370/234 |
| 5,727,002 A | * | 3/1998 | Miller et al. ................... 371/32 |
| 5,831,973 A | * | 11/1998 | Yokotani et al. ............. 370/236 |
| 6,112,323 A | * | 8/2000 | Meizlik et al. .............. 714/748 |
| 6,115,749 A | * | 9/2000 | Golestani et al. ........... 709/235 |
| 6,151,633 A | * | 11/2000 | Hurst et al. .................. 709/235 |
| 6,151,696 A | * | 11/2000 | Miller et al. ................. 714/748 |
| 6,205,120 B1 | * | 3/2001 | Packet et al. ................ 370/235 |
| 6,427,166 B1 | * | 7/2002 | Hurst et al. .................. 709/220 |
| 6,487,603 B1 | * | 11/2002 | Schuster et al. ............. 370/252 |

* cited by examiner

Primary Examiner—Chi Pham
Assistant Examiner—Anh-Vu Ly

(57) ABSTRACT

The operation of a multicast network is enhanced by shifting the responsibility for performing congestion control with regulation for the transmission of multicast data packets from the transmitter to the receivers, such that each receiver computes a congestion control value using particular statistics that it accumulates and then forwards it congestion control value to the source/transmitter. The source then regulates its transmission of data packets in accordance with a selected one of the congestion control values that it receives. Moreover, a hierarchical reporting network may be used to convey the regulation values from the receivers to the source such that congestion control values generated by the receivers are consolidated at various layers in the hierarchical reporting network so that the source receives consolidated control values from just the receivers connected directly to the source, rather than a value from each of the receivers.

18 Claims, 3 Drawing Sheets

SCALEABLE CONGESTION CONTROL METHOD FOR MULTICAST COMMUNICATIONS OVER A DATA NETWORK

FIELD OF THE INVENTION

The invention relates to data networks, and more particularly relates to an effective congestion control mechanism for multicast communications.

BACKGROUND OF THE INVENTION

Some form of effective congestion control is needed in the operation of a data network to ensure that data packets will be forwarded to their respective destinations during periods of high demand for network resources. If the congestion control specified for a data network is not effective, then it is likely that data messages could be lost at a network location that is experiencing congestion.

There are several well-known forms of congestion control including rate based and window based controls. In a rate based control, a source transmits data packets at a predetermined rate. The source also monitors a number of well-known parameters and statistics indicative of network congestion including, for example, the round-trip-delay between the source and receiver, the number of packets which do not reach the receiver within a predetermined period of time as noted in acknowledgments that the receiver returns to the source, etc.

In a window based control scheme, the source stops its transmission of data packets to the receiver when it determines in a conventional manner that the number of outstanding, unacknowledged packets set for the transmission window has been reached. (The size of the window is typically based on, for example, the round trip delay between the source and receiver as well as the rate of packet losses.) The source resumes its transmission, keeping the number of outstanding data packets within the size of the window, when it receives an acknowledgment from the receiver. Similarly, the source may adjust the size of the window, and thus the number of outstanding packets that are transmitted during the window, based on different parameters and statistics indicative of network congestion that the source collects.

The foregoing controls work well for unicast transmissions involving a source and a single receiver. Also, the burden of continually accumulating such network parameters and statistics to regulate the transmission rate or the size of window is minimal in a unicast transmission. However, that is not the case for multicast transmissions where a data packet is routed to a large number of receivers based on a particular parameter, e.g., a group address. The reason for this is that a source in a multicast system would have to continually accumulate statistics for each receiver and calculate a rate or window suitable for all of the receivers, which would severely burden the processing and computational time at the source. Thus, performing congestion control in a multicast system involving a very large number of receivers, e.g., >100 receivers, would be a formidable undertaking.

SUMMARY OF THE INVENTION

I have recognized that the computational burden involved in implementing congestion control with regulation for multicast transmission should be shifted to the receivers, with each receiver computing a congestion control value/parameter using its respective statistics, and then forwarding the congestion control value to the source. The source then selects a predetermined one of the congestion control values that it receives from the receivers and uses the selected value to control the transmission of data messages, all in accordance with the invention.

As an aspect of the invention, the selected congestion control value may be based on the minimum of the received values.

As another aspect of the invention, a hierarchical reporting network is used to convey the congestion control values from the receivers. Specifically, congestion control values generated by the receivers are consolidated at various layers in the hierarchical reporting network so that the source receives consolidated congestion control values from just the receivers connected directly to the source, rather than a value from each of the receivers.

These are and other aspects of invention are set forth in following detailed description and accompanying drawings.

DETAILED DESCRIPTION

Figure 1:
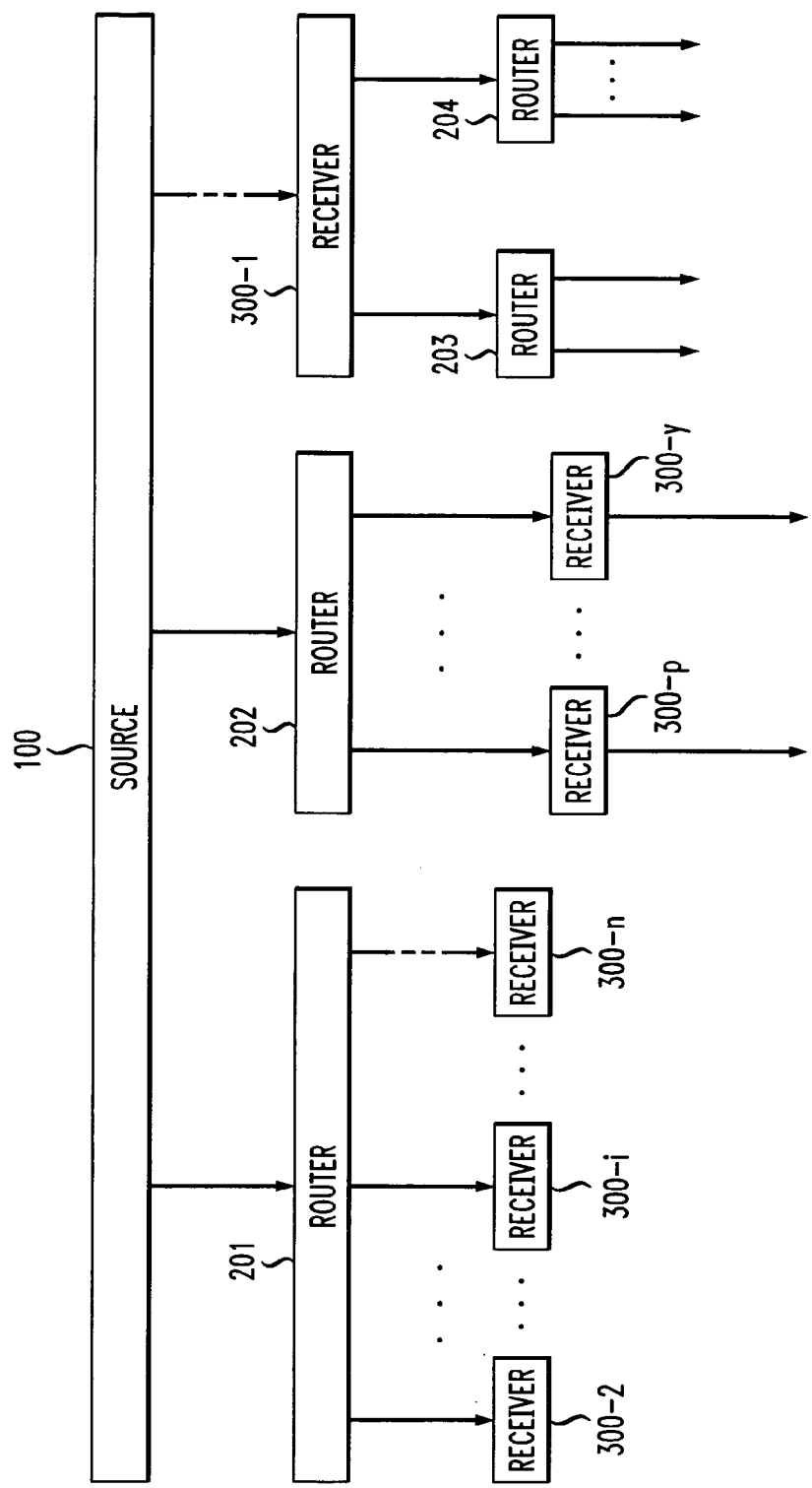
FIG. 1 is a broad block diagram of a unicast data network in which the principles of the invention may be practiced.

A broad block diagram of a portion of a data network in which the principles of the invention may be practiced is shown in FIG. 1, in which a source 100 transmits data messages to a multicast group of receivers 300-1 through 300-y via respective ones of conventional routers 201 through 204 and individual ones of the receivers. The receivers may be any conventional computer equipment, e.g., a work station, main frame computer, personal computer, capable of operating in a data network environment, for example, the well-known Internet. The computer equipment, in accordance with an aspect of the invention, should also be capable of maintaining a respective window size or data rate, as the case may be, using conventional congestion control techniques.

(Note that the following description first discusses the various aspects of the invention in the context of a window based scheme. It then discusses a rate based scheme.)

As mentioned above, each of the receivers in a window based scheme, in accordance with the invention, continuously monitors its transmission path from the source to itself in any appropriate manner to collect various statistics (e.g., the number of lost data packets indicative of the level of congestion occurring along that path). The receiver uses the collected statistics to regularly update its respective transmission window size for the purpose of congestion control. It then determines a congestion control value as a function of the window size and other local parameters discussed below.

(For the purpose of the following discussion, it is noted that a sequence number is typically associated with a respective data packet in a system which uses a data packet of a fixed sized; whereas, a sequence number is typically associated with the last data byte in the payload of a packet in a system which uses a data packet of a variable size.)

Specifically, assume, for example, that at time t receiver 300-$i$ has a window size of $w_i$ and that the sequence number of the last data packet that receiver 300-$i$ received successfully from source 100 is $m_i$ and all packets up to $m_i$ have been received. Receiver 300-$i$ then returns as feedback to source 100 a congestion control value, $n_i$, determined as follows:

$$n_i = w_i + m_i \quad (1)$$

where $n_i$ identifies the maximum sequence number that source 100 may transmit with respect to receiver 300-$i$. For example, If $w_i$ equals 8 and $m_i$ equals the sequence number of 152, then receiver 300-$i$ returns as feedback a transmission congestion control value of 160 to indicate that the source may transmit, for example, those data packets respectively having sequence numbers through 160. Similarly, source 100 receives a congestion control value from each of the receivers in the multicast group. To meet the congestion control requirement for the multicast group, source 100 selects, for example, the smallest of the congestion control values that it respectively received from the receivers, and uses the selected value as the maximum sequence number for the data packets that the source may transmit to the multicast group.

Advantageously, then, the bulk of the congestion control activity is performed at the receivers, rather than at the source or transmitter.

The computation of a congestion control value by a receiver 300-$i$ when packets are not received in sequence may be determined as follows. Specifically, assume that at time t the transmission window is $w_i$, that receiver 300-$i$ successfully received all of the data packets up to sequence number $m_i$, and that $k_i$ denotes the total length of the data packets that have been received after sequence number $m_i$ (or are not expected to be received at a later time). For that case, then, $n_i$ may be expressed in the following way:

$$n_i = m_i + k_i + w_i \quad (2)$$

A receiver may thus account for outstanding data packets in the congestion control value that it returns to the transmitter. Note that each of the receivers performs the foregoing using its respective statistics and returns the resulting congestion control value as feedback to the source.

It is well-known that a receiver of data packet uses a buffer to assemble in proper order data messages that it receives from a source. It is also well-known that the buffer may overflow when data messages are received faster than they can be re-assembled in sequence for delivery to an upper-layer processor. The task of preventing a re-assembly buffer from overflowing at a receiver is thus an important aspect of window congestion control in a data network, e.g., the Internet. In Internet, or TCP, terminology, this protection function is called "flow control". I have recognized that the inventive receiver window-based control scheme described immediately above could be adapted to include flow control. In particular, assume that $B_i$ notes the amount of space that is available in the re-assembly buffer for storing data messages that have been received out of sequence at receiver 300-$i$ following receipt of the data message of sequence number $m_i$. Also Assume that the out-of-sequence data messages need to be re-assembled in proper sequence before they can be delivered to an application layer. For that case, then, a received data messages having a sequence number greater than $m_i + B_i$ could be lost as a result of congestion occurring at the re-assembly buffer. This problem may be dealt with by including that statistic in the determination of the congestion control value, $n_i$, in the following way:

$$n_i = m_i + \min(k_i + w_i, B_i) \quad (3)$$

It can be appreciated from the foregoing that the source will regularly receive a feedback message from each of the receivers in the multicast group. If the group is formed by a large number of receivers, e.g., >100, then the source will receive a like number of feedback messages. The processing of a large number of feedback messages at the source could consume an appreciable portion of the processing time at the source. I deal with this problem, in accordance with an aspect of the invention, by organizing the receivers into a hierarchical reporting structure (tree structure) for the purpose of performing feedback consolidation at receivers positioned at intermediate and higher layers in the hierarchical reporting network and presenting source 100 instead with what I call consolidated-congestion-control-feedback messages. Accordingly, then, source 100 need only process a few consolidated feedback messages which summarize the content of the feedback messages transmitted by the receivers forming multicast group 300.

Each receiver, more particularly, consolidates congestion control values that it receives from receivers that are positioned at a lower layer in the hierarchy and directly connected to it (i.e., each of its children) and forwards the consolidated result upward to the receiver positioned at a next higher layer in the hierarchy (i.e., its parent). A receiver, e.g., receiver 300-$j$, FIG. 2, which receives consolidated feedback messages from its children processes the congestion control values contained in those messages with its own (local) congestion control value, $n_j$, to generate a consolidated feedback parameter, $F_j$. The consolidation process is based on the following expression which provides the minimum of the feedback values that the receiver processes:

$$F_j = \min[f_j, \min_{k \in C_j} F_k] \quad (4)$$

where $f_j$ is equal to the local congestion control value, i.e., $n_j$, that receiver 300-$j$ calculated; $F_k$ is the most recent consolidated congestion control value received as feedback from the child receivers, such as receivers 300-$k$ and 300-$l$, positioned at the preceding level; and $C_j$ denotes the set of children receivers, such as receivers 300-$k$ and 300-$l$, that report to receiver 300-$j$; i.e., those receivers positioned below (i.e., connected to) receiver 300-$j$ in the reporting hierarchy. (Note that if receiver 300-$j$ has no children, then $C_j$ is an empty set and $F_j = f_j$.) Source 100, in turn, processes the contents of the consolidated feedback messages that it receives from those receivers that report directly to source 100 to determine the minimum of all of the sequence numbers generated by the receivers 300. Source 100 then transmits the data packets up to the sequence number specified by the determined minimum.

The various aspects of the invention described above may also be applied to a multicast network employing a rate based congestion control scheme. Specifically, each receiver, 300-$i$, in the multicast group continually monitors its specific transmission path from the source to the receiver in any appropriate manner to collect various statistics/data (e.g., the number of lost data packets) indicative of the level of congestion occurring along that path, as mentioned above. The receiver regularly updates the maximum acceptable rate, $r_i$, at which it should be receiving data packets from source 100 via its specific transmission path as a function of the latest of such statistics. The receiver 300-$i$ then forwards the determined rate as feedback, $f_j$, to the next highest level in the hierarchical reporting network. In the manner described immediately above, a receiver thereat consolidates the various feedback values that it recently received from the receivers in the preceding layer, $F_i$, with its own feedback value, $f_j$, using expression (4) and forwards the consolidated transmission rate, $F_j$, to the next highest layer, which could be source 100. Source 100, in turn, selects as the transmission rate at which it will transmit the next set of data messages the minimum of the feedback values, $F_j$, that it received from the receivers that report directly to source 100 via the hierarchical network.

Figure 2:
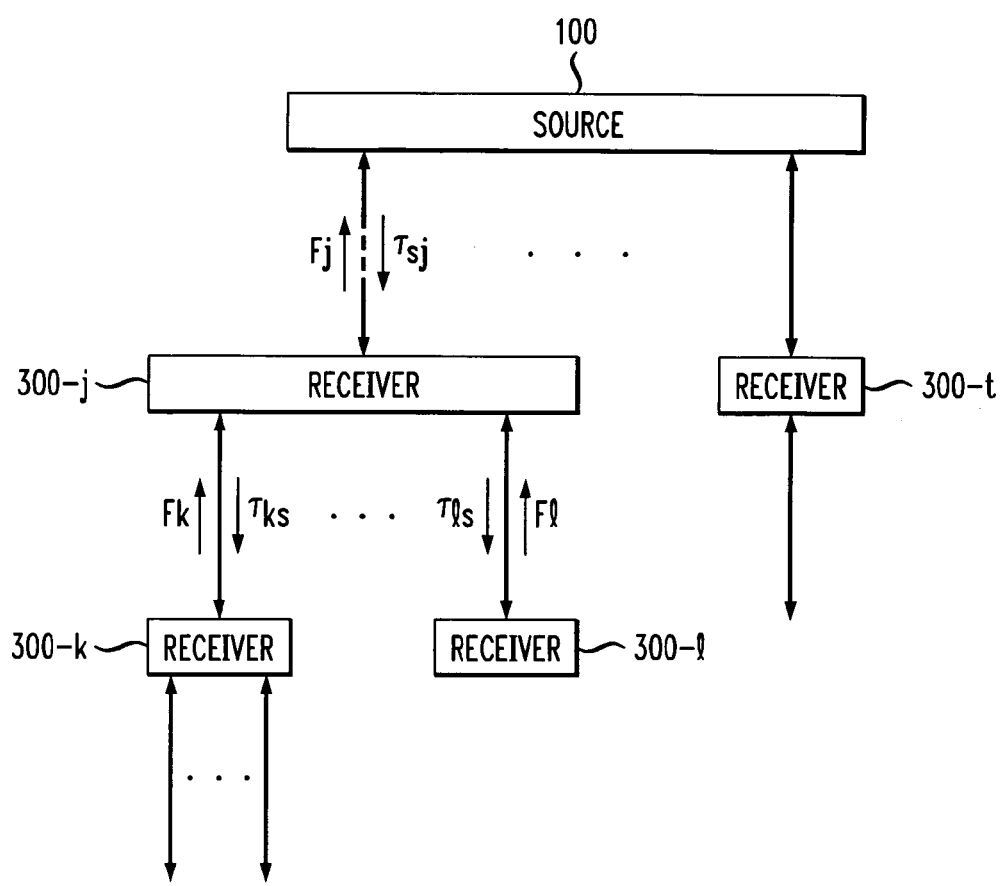
FIG. 2 is a broad block diagram of a portion of a hierarchical reporting network formed by individual ones of the receivers of FIG. 2.

It is noted that the architecture of the reporting hierarchy formed by the receivers shown in FIG. 2 is somewhat different from the architecture of the IP layer multicast tree shown in FIG. 1. It is recognized, however, that it is possible to use the IP layer multicast architecture of FIG. 1 to consolidate receiver feedback. In this case, each router of the IP layer multicast tree could be arranged to perform the consolidation function and send the result to its parent router.

In general, the feedback messages, $F_j$, that a receiver sends upstream may be sent each time $F_j$ changes. Note that the number of feedback messages, $F_j$, that are transmitted upstream may be reduced by arranging each receiver so that it transmits a consolidated feedback message periodically, e.g., a period equal to the round trip delay between itself and source 100, or a more definite period of time, e.g., once every two milliseconds.

Also note that, depending on the algorithm used to update $w_j$ or $r_j$, a receiver may need to know the round trip delay between itself and source 100. The following presents an algorithm that estimates the receiver round trip time, in which the algorithm assumes that some kind of clock synchronization exists between the source and receivers.

Specifically, consider that $\tau_{sj}$ is the one way delay from source 100 to receiver 300-$j$; $\tau_{js}$ is the one way delay from receiver 300-$j$ to the source 100; and that receiver 300-$j$ maintains the delay parameter $\tau_{ks}$ for each of its child receivers 300-$k$. Receiver 300-$j$ also supplies the delay value $\tau_{ks}$ to its child receiver 300-$k$ and continuously updates that value as described below. In addition, source 100 inserts a time stamp in each of the data packets that its transmits to the multicast group. When receiver 300-$j$ receives a multicast transmission it determines the difference between the value of the time stamp contained in the received packet with the time at which it received the packet, and uses that difference as a new sample, S, to update $\tau_{sj}$ in the following manner:

$$\tau_{sj} = \tau_{sj}(1-\beta) + S\beta \quad (5)$$

where $\tau_{sj}$ is an exponentiated weighted running average of the sample S. If the feedback from receiver j is sent periodically with a period of $\delta_j$, then the waiting time from the arrival of a packet until the transmission of the next feedback is a random variable between 0 and $\delta_j$ that has uniform distribution and an average value equal to $1/2\delta_j$. Moreover, the parent of receiver 300-$j$, e.g., source 100, maintains a running average of the delay that occurs in receiving a feedback message with a respective time stamp from each of its children and supplies the calculated delay, e.g., $\tau_{js}$, to the respective child receiver 300-$j$. Receiver 300-$j$, upon receipt of $\tau_{js}$ from its parent receiver uses that value to calculate and store in its local memory a running average of the trip delay from each of its child receivers to the source as shown in the following manner for receiver 300-$k$:

$$\tau_{ks} = \tau_{kj} + \tau_{js} + 1/2\delta_j \quad (6)$$

Receiver 300-$j$ also performs a similar calculation for each of its other child receivers, such as receiver 300-$l$. It then sends $\delta_{ks}$ to each child receiver 300-$k$.

Also, each receiver 300-$j$ calculates its round trip time $\tau_j$ from the source as follows:

$$\tau_j = \tau_{sj} + \tau_{js} + 1/2\delta_j \quad (7)$$

Figure 3:
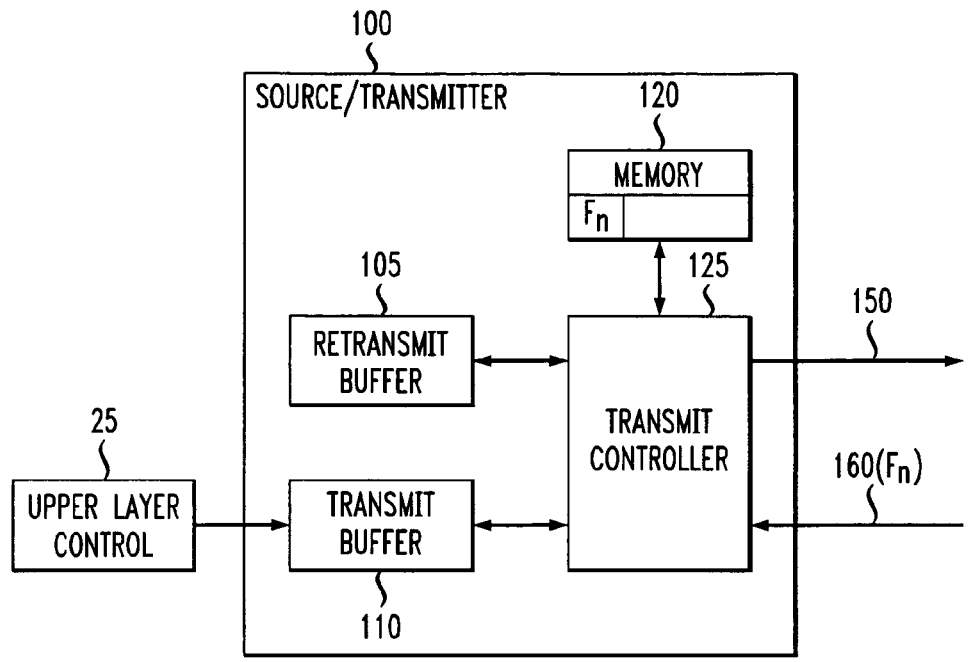
FIG. 3 is a broad block diagram of the source transmitter of FIG. 1.

An exemplary embodiment of source 100 is shown in FIG. 3, in which source/transmitter 100 may constitute the transmitter section of a data terminal contained in, e.g., a packet switch, host computer, etc., or within an interface circuit disposed between a computer and a data network. Specifically, transmitter 100 includes transmit data buffer 110 at an input which allows a data producing processor serving as upper layer control 25 to store data messages in sequential memory locations of buffer 110. After a data messages has been stored in buffer 110, it is then available for retrieval by controller 125. That is, controller 125 unloads data in the order that they have been stored in buffer 110 and forms the data into a data packet. Controller 125 includes appropriate software that generates a sequence number over the data byes forming the payload of the data packet and then inserts the sequence number into the packet. Controller 125 also includes software which generates a conventional time stamp and then inserts the time in the packet being formed. Controller 100, after unloading a packet from buffer 110 inserts the current count value supplied by generator 110 in the packet as a sequence number. When the packet has been so formed, then controller 125 transmits the packet in accordance with the current congestion control value, Fs, that controller 125 had stored in memory 120. Controller 125 then stores a copy of the transmitted packet in re-transmit buffer 105 so that the packet will thereafter be available for re-transmission to the multicast group of receivers. Controller 125 is also programmed in a conventional manner to receive acknowledgments from receivers that received the transmitted packet correctly. It is also programmed in a conventional manner to (a) receive messages bearing consolidated feedback values from the receivers via the aforementioned hierarchical reporting network; (b) store the values as they are received in memory 120; (c) then select the least of the received consolidated feedback values; and (d) to regulate traffic according to the values of the feedback Fs. It is further programmed in a conventional manner to supply the appropriate trip delay information to the receivers positioned just below the source in the reporting hierarchy so that those receivers may determine the trip delay to source/transmitter 100 in the described way and supply that information downstream.

Figure 4:
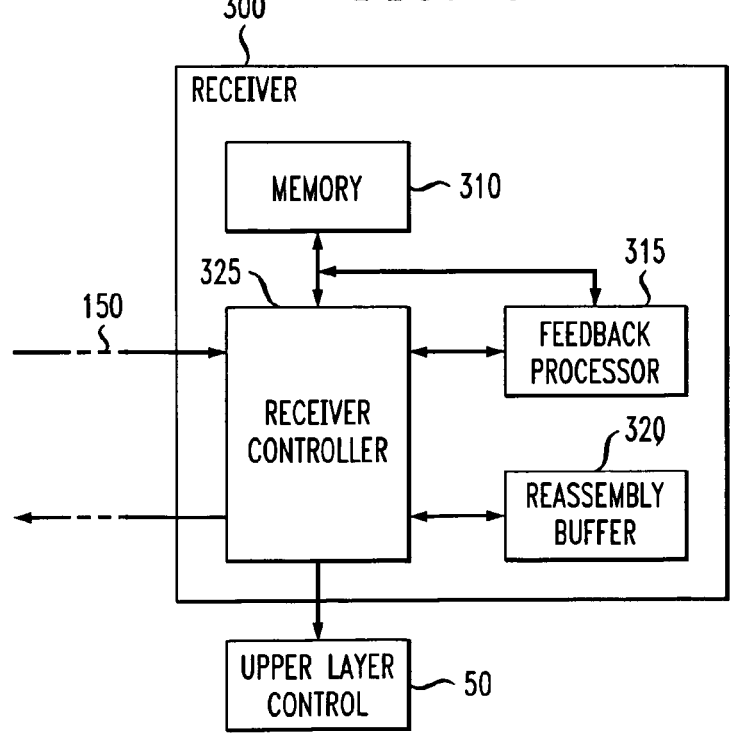
FIG. 4 is a broad block diagram of a receiver of FIG. 1.

An exemplary embodiment of a receiver 300 is shown in FIG. 4. A receiver 300 includes a controller 325, memory 310, feedback processor 315 and assembly buffer 320. Upon receipt of a data packet at receiver 300, controller 325 connected to the multicast group as represented by path 150 checks the packet in a conventional manner to identify the packets that have been lost and the packets that have been received successfully, and supplies such information to processor 315. It also checks the received packets to see if it contains any errors and discards the packets if it does. If the received packet does not contain an error, then controller 325 stores the packet in reassemble buffer 320. It also stores copies of the sequence number and time stamp in memory 310 as described above for processing by feedback processor 315. Thereafter, controller 325 supplies those packets stored in buffer 320 that are in sequence to upper control layer 50 in proper order. Feedback processor 315 is programmed in a conventional manner to determine the current window size or transmission rate, as the case may be, based on packet losses, packets received correctly and the round trip delay values acquired from the receiver hierarchy as described above. It is also programmed in a conventional manner to generate in the described manner $r_j$ in a rate based scheme or $w_j$ in a window based scheme. Feedback controller 315 periodically generates a feedback message with a time stamp and supplies the message to controller 325 for transmission to the next receiver in the hierarchy, as mentioned above.

It will thus be appreciated that, although the invention illustrated herein is described in the context of a specific illustrative embodiment, those skilled in the art will be able to devise numerous alternative arrangements which, although not explicitly shown or described herein, nevertheless, embody the principles of the invention and are within its spirit and scope.

I claim:

1. A data network comprising
a source that transmits data messages to a plurality of receivers, said receivers forming a multicast group, and wherein each of said plurality of receivers comprises
a first apparatus that receives transmissions of data messages from the source to each of said plurality of receivers and accumulates statistics relating to said transmissions of data messages from the source to said receiver,
a second apparatus that computes a congestion control value and sends the value to the source, and wherein the source adjusts its transmission of data packets to the receivers as a function of a selected one or more of a plurality of congestion control values that it receives from respective ones of the receivers,
wherein the receivers forming the multicast group also form a multilevel hierarchical reporting network that forwards a congestion control value to the source, wherein a receiver positioned at each level in said multilevel hierarchical reporting network includes apparatus that computes a new consolidated congestion control value, said new consolidated congestion control value being a function of the congestion control value that said receiver locally generates and a consolidated congestion control value that said receiver receives from receivers positioned at a preceding level in said multilevel hierarchical reporting network, and said receiver then forwarding said new consolidated congestion control value to the source via the next succeeding level in the multilevel hierarchical reporting network.

2. The data network of claim 1 wherein the source is positioned at the highest level in the reporting hierarchy.

3. The data network of claim 2 wherein each of the receivers uses a rate based scheme to determine its respective congestion control value, and wherein the source applies the minimum of the of the congestion control values that it respectively receives from the receivers as a rate of transmission of new data packets.

4. The data network of claim 1 wherein each of the receivers uses a window based scheme to determine a maximum expected sequence number as its respective congestion control value, and wherein the source uses the minimum of the congestion control values that it respectively receives from the receivers as a maximum sequence number of a next packet that the source transmits to the receivers.

5. The data network of claim 4 wherein the second apparatus includes apparatus that determines a transmission window as a function of loss and delay measured by the respective receiver, and generates the respective congestion control value as a function of (a) the determined transmission window and (b) sequence number of the last data packet received successfully in sequence with prior received data packets.

6. The data network of claim 4 wherein the second apparatus includes apparatus that determines a transmission window as a function of loss and delay measured by the respective receiver and generates its respective congestion control value as (a) a function of the determined transmission window, (b) sequence number of a last data packet received successfully in sequence with prior received data packets and (c) number of data packets received out of sequence.

7. The data network of claim 4 wherein each receiver includes a buffer for storing received data messages and wherein the second apparatus includes apparatus that determines a transmission window as a function of loss and delay measured by the respective receiver and generates its respective congestion control value as (a) a function of the sequence number of a last data packet received successfully in sequence with prior received data packets and minimum of (b1) the transmission window plus the number of data packets received out of sequence, or (b2) the number of memory locations in the reassembly buffer available for the storage of out-of-sequence data packets.

8. The data network of claim 1 wherein each of the receivers uses a window based scheme to determine, as a function of an updated window size, maximum sequence number of packets contiguously received, total length of received packets that are not contiguous and size of an associated reassembly buffer a maximum expected sequence number as its respective congestion control value, and wherein the source uses the minimum of the congestion control values that it respectively receives from the receivers as a maximum sequence number of a next packet that the source transmits to the receivers.

9. The data network of 1 wherein the source inserts a time stamp in a data packet that it transmits to the multicast group of receivers and wherein the first apparatus associates a received data packet with a current time stamp and wherein said first apparatus includes apparatus that determines a trip delay from the source to each of said plurality of receivers as a function of the difference of the inserted time stamp and a current time stamp.

10. The data network of claim 1 wherein each receiver further includes third apparatus that determines a trip delay to the source via the reporting network as a function of a (a) time stamp that it associates with a message containing a congestion control value that the receiver forwards to a receiver positioned at the next highest level in the reporting hierarchy, and (b) trip delay returned by the receiver positioned at the next highest level, in which the returned trip delay is indicative of the trip delay from the latter receiver to the source.

11. The data network of claim 10 wherein each of the receivers forward its respective congestion control value to the source via the IP layer multicast network.

12. A data receiver, comprising:
   first apparatus that receives a data packet from a source of data packets and accumulates particular information relating to the transmission of data packets toward a receiver via a data network; and
   second apparatus that generates a transmission control value as a function of the accumulated information and forwards the generated value as a feedback message toward the source, said feedback message to enable the source to control its transmission of data messages as a function of (a) the transmission control value received from the receiver and (b) transmission control values received by the receiver from other receivers, wherein said data receiver is one of a plurality of receivers that form a multicast group within the data network, wherein the multicast group of receivers form a multilevel hierarchical reporting network that forwards a transmission congestion control value toward the source and wherein a receiver positioned at an intermediate level in the reporting hierarchy includes apparatus that generates a new consolidated congestion control value as a function of a combination of the congestion control value that it generates locally and each consolidated congestion control value that it receives from receivers positioned at the preceding level in the hierarchy and then forwards the new consolidated congestion control value to the source via the next succeeding level in the reporting network.

13. The receiver of claim 12 wherein the second apparatus includes apparatus that determines a transmission window as a function of loss and delay measured by the respective receiver and generates its respective congestion control value as a function of the determined transmission window and sequence number of the last data packet received successfully in sequence with prior received data packets.

14. The receiver of claim 12 wherein each of the receivers uses a window based scheme to determine, as a function of an updated widow size, maximum sequence number of packets contiguously received, total length of received packets that are not contiguous and size of an associated reassembly buffer a maximum expected sequence number as its respective congestion control value, and wherein the source uses the minimum of the congestion control values that it respectively receives from the receivers as a maximum sequence number of a next packet that the source transmits to the receivers.

15. The receiver of claim 12 wherein the second apparatus includes apparatus that determines a transmission window as a function of loss and delay measured by the respective receiver and generates its respective congestion control value as a (a) function of the determined transmission window, sequence number of the last data packet received successfully in sequence with prior received data packets and (b) number of data packets received out of sequence.

16. A data receiver, comprising:
   first apparatus that receives a data packet from a source of data packets and accumulates particular information relating to the transmission of data packets toward a receiver via a data network; and
   second apparatus that generates a transmission control value as a function of the accumulated information and forwards the generated value as a feedback message toward the source, said feedback message to enable the source to control its transmission of data messages as a function of (a) the transmission control value received from the receiver and (b) transmission control values received by the receiver from other such receivers, wherein said data receiver uses a window based scheme to determine a maximum expected sequence number as its respective transmission control value, and wherein the source uses the minimum of the transmission control values that it receives as a maximum sequence number of a next packet that the source transmits to each said receiver.

17. A data receiver comprising
   first apparatus that receives a data packet from a source of data packets and accumulates particular information relating to the transmission of data packets toward a receiver via a data network; and
   second apparatus that generates a transmission control value as a function of the accumulated information and forwards the generated value as a feedback message toward the source, said feedback message to enable the source to control its transmission of data messages as a function of (a) the transmission control value received from the receiver and (b) transmission control values received by the receiver from other receivers, wherein each receiver further comprises a re-assembly buffer for storing received data packets and wherein the second apparatus includes apparatus that determines a congestion control value as a function of function of loss and delay measured by the respective receiver; and
   generates its respective congestion control value as a (a) function of the sequence number of a last data packet received successfully in sequence with prior received data packets and minimum of (b) a transmission window plus the number of data messages received out of sequence, and (b2) the number of memory locations in the reassembly buffer available for the storage of out-of-sequence data packets.

18. A data receiver, comprising:
   first apparatus that receives a data packet from a source of data packets and accumulates particular information relating to the transmission of data packets toward a receiver via a data network; and
   second apparatus that generates a transmission control value as a function of the accumulated information and forwards the generated value as a feedback message toward the source, said feedback message to enable the source to control its transmission of data messages as a function of (a) the transmission control value received from the receiver and (b) transmission control values received by the receiver from other receivers, wherein said data receiver is one of a plurality of receivers that form a multicast group within the data network, wherein each receiver further includes third apparatus that determines a trip delay to the source via a hierarchical reporting network as a function of a (a) time stamp that it associates with a message containing a congestion control value that the receiver forwards to a first receiver positioned at the next highest level in the reporting hierarchy, and (b) trip delay returned by the first receiver positioned at the next highest level, in which the returned trip delay is indicative of the trip delay from the first receiver to the source.

* * * * *